US006635181B2

(12) United States Patent
Bose

(10) Patent No.: US 6,635,181 B2
(45) Date of Patent: Oct. 21, 2003

(54) CONTINUOUS, HYBRID FIELD-GRADIENT DEVICE FOR MAGNETIC COLLOID BASED SEPARATIONS

(75) Inventor: Arijit Bose, Lexington, MA (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 57 days.

(21) Appl. No.: 09/933,381

(22) Filed: Aug. 20, 2001

(65) Prior Publication Data

US 2002/0134730 A1 Sep. 26, 2002

Related U.S. Application Data

(63) Continuation-in-part of application No. 09/720,608, filed as application No. PCT/US99/14962 on Jul. 1, 1999, now Pat. No. 6,346,196.

(51) Int. Cl.[7] ................................ B01D 35/06

(52) U.S. Cl. .................. 210/695; 210/143; 210/222; 209/223.1; 209/225; 435/7.5; 435/173.9; 435/261; 436/526

(58) Field of Search .................. 210/143, 222, 210/695; 209/223.1, 225; 435/7.5, 173.9, 261; 436/526

(56) References Cited

U.S. PATENT DOCUMENTS

| | | | |
|---|---|---|---|
| 5,336,760 A | 8/1994 | Hardwick et al. | |
| 5,567,326 A | 10/1996 | Ekenberg et al. | |
| 5,622,831 A | 4/1997 | Liberti et al. | |
| 5,641,622 A | 6/1997 | Lake et al. | |
| 6,346,196 B1 * | 2/2002 | Bose | 210/695 |

FOREIGN PATENT DOCUMENTS

| | | | |
|---|---|---|---|
| DE | 3827252 A | | 2/1990 |
| DE | 19955169 | | 5/2001 |
| WO | WO 9626011 A | | 8/1996 |
| WO | WO 9959694 | | 11/1999 |
| WO | WO 00/01462 | * | 1/2000 |
| WO | WO 0110558 | | 2/2001 |

* cited by examiner

*Primary Examiner*—David A. Reifsnyder
(74) *Attorney, Agent, or Firm*—Samuels, Gauthier & Stevens, LLP

(57) ABSTRACT

A continuous, hybrid magnetic field gradient device for colloidal magnetic affinity separation having an axially-rotating horizontal glass tube, and a plurality of axially located repeating magnetic units. Each magnetic units consists of an alternating current solenoid that surrounds the chamber followed by computer-controlled electromagnets carrying a direct current. The on-off cycle of the electromagnets is used to control the residence time of target-bound magnetic particles in the chamber thereby allowing the separate collection of the particle and target rich fractions and the target-lean fractions without interrupting the feed flow. The azimuthally flowing alternating current in the solenoid introduces transient axial and radial forces as well as torque on the magnetic particles, promoting mixing.

10 Claims, 4 Drawing Sheets

CONTINUOUS, HYBRID FIELD-GRADIENT DEVICE FOR MAGNETIC COLLOID BASED SEPARATIONS

CROSS-REFERENCE TO RELATED APPLICATIONS

This application is a continuation-in-part of U.S. application Ser. No. 09/720,608, filed Jan. 1, 2001, now U.S. Pat. No. 6,346,196B1 which was the National Stage of International Application No. PCT/US99/14962, filed Jul. 1, 1999.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. CTS 9618635 awarded by National Science Foundation.

BACKGROUND OF THE INVENTION

Precious and contaminant metal ion removal and recovery from aqueous solutions is becoming increasingly important from both an environmental and economic perspective. Current methods to recover precious and contaminant metal ion from aqueous solutions involve the utilization of ion exchange beds. The key difficulty with using ion exchange beds is the limited availability of the internal pore spaces, as well as large pressure drops required to move fluids through the packed matrices. The present invention provides a method and device which addresses these problems.

BRIEF SUMMARY OF THE INVENTION

The parent application discloses a device (system) and method for the magnetic separation of target particles (macromolecules) from a mixture. Biotin is bound to a target particle. Magnetic beads labeled with avidin or streptlavidin are mixed with the target particles. The avidin or streptlavidin binds to the biotin and the bound complex is magnetically separated from the mixture.

The invention disclosed in the parent application embodies a flow-through multi magnetic-unit device comprising a slowly rotating horizontal chamber designed for a colloidal magnetic affinity separation process. Each magnetic unit consists of an alternating current carrying solenoid surrounding the chamber, and a pair of permanent magnets located downstream from the solenoid, that rotate with the chamber. The chamber rotation simulates a low gravity environment, severely attenuating any sedimentation of non-neutrally buoyant magnetic particles as well as feed, thus promoting good particle-target contact throughout the chamber volume. The oscillating magnetic field gradient produced by the solenoid introduces translational and rotary microparticle oscillations, enhancing mixing, while the permanent magnets immobilize the targets on the chamber walls.

The present invention comprises a fully continuous, hybrid field-gradient device (system) for magnetic affinity separation having a chamber with a plurality of repeating magnetic units distributed axially along the tube. Each magnetic unit comprises a stationary alternating current solenoid that surrounds the chamber, followed by a direct current flowing, computer controlled electromagnet, placed downstream of the solenoid. The alternating current carrying solenoids impart translational and rotary oscillations to the magnetic particles, enhancing mixing. The computer-controlled electromagnets draw magnetic particles to the chamber walls, and increase their residence time in the chamber. By manipulating the on-off cycle for these electromagnets, the exiting solution can be switched between one stream that contains a negligible concentration of target bound magnetic particles and another stream that has a high concentration of the target, bond magnetic particles without interrupting the feed.

In one embodiment, the continuous, hybrid field-gradient device is used to remove cadmium ions from a cadmium sulfate solution. 1–10 μm diameter anion-exchange-resin-coated magnetic particles at a concentration of about 0.5 mg particles/mL are used as the mobile solid support. The feed consists of a 10.0 mg/L cadmium sulfate solution, at a flow rate of about 25 mL/min.

In another aspect of the invention, the continuous, hybrid field-gradient device is operated as a three-stage crosscurrent cascade wherein about 45%, 58% and 63% of the entering cadmium ions are removed at each stage respectively, with stage efficiencies that vary between about 57–65%. More than about 90% of the entering cadmium ions are removed.

The continuous, hybrid field-gradient device for colloidal magnetic affinity separation can be useful in any industry wherein affinity based separations are desired such as the electroplating industry, biotechnological industry and/or nuclear industry.

DESCRIPTION OF THE PREFERRED EMBODIMENT(S)

Figure 1:
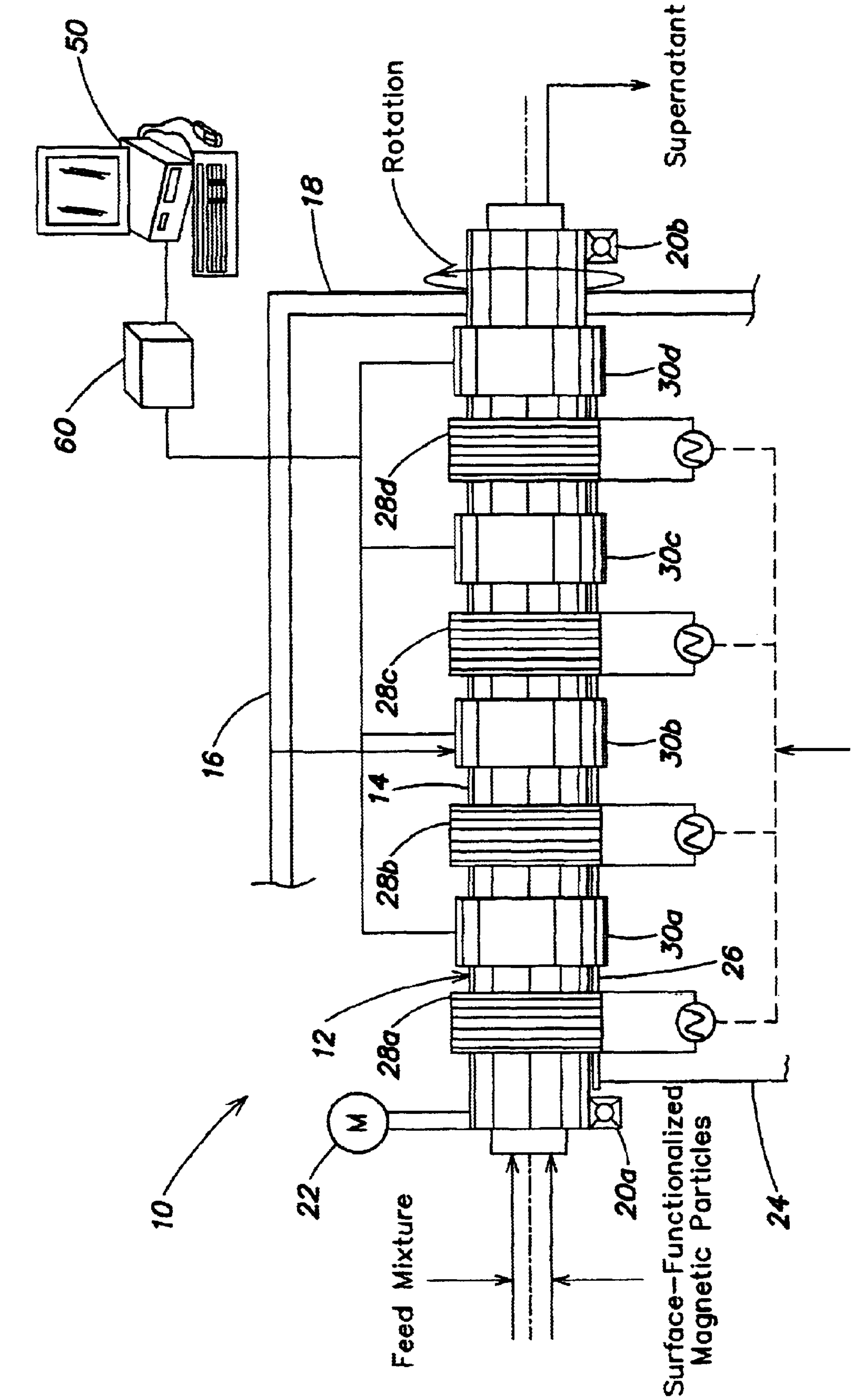
FIG. 1 is a schematic representation of a device embodying the invention.

A separation device 10 embodying the invention is shown schematically in FIG. 1 and comprises a tubular chamber 12 having a wall 14. The chamber is a long, e.g. 1.0 m, axially-rotating horizontal glass tube having an internal diameter, e.g. 1.0 cm. A protective sleeve 16 is secured to the wall 14 by an end wall 18. The wall 14 is rotatably supported on bearing blocks 20*a* and 20*b*. A motor 22 rotates (drives) the wall 14, and thereby the chamber 12 and the sleeve 16, by any suitable means, belt driven, gear driven, etc.

A base 24, supports a horizontal rod 26 which rod 26 passes through the open end of the sleeve 16. Four repeating zones are defined in the chamber 12. Each zone comprises an alternating current solenoid 28*a*–28*d* and an electromagnet 30*a*–30*d*. Each solenoid 28*a*–28*d* is spaced apart from an electromagnet 30 in an alternating relationship and positioned at a fixed distance, e.g. 4.0 cm. Both the solenoids 28*a*–28*d* and the electromagnets 30*a*–30*d* are fixed to the rod 26 and remain fixed as the chamber rotates.

A computer 50 is in communication with a power source 60 and the electromagnets 30*a*–30*d*. The computer 50 controls the flow of a direct current in the electromagnets 30*a*–30*d* thereby generating radial magnetic field gradients within the chamber 12 which allows magnetic particles to be drawn to the chamber wall 14. The slow rotation of the chamber 12 stimulates a low-gravity environment within the chamber 12 and significantly reduces sedimentation of non-neutrally buoyant particles without introducing centrifugal forces, a critical feature of this device. Separate peristaltic pumps drive the feed mixture and the magnetic colloid suspension through a rotary coupler (Deublin Inc.) into one end of the chamber 12. A second rotary coupler (not shown) at the other end of the chamber allows the exiting liquid to flow into a stationary collection vessel (not shown).

As the magnetic particles and ion solution flow into the chamber 12, the alternating current carrying solenoids 28*a*–28*d* induce a time varying axial magnetic field gradient that causes translation and rotary oscillation of the magnetic particles and promotes better contact between the particles and the ions in the solution. The computer controlled electromagnets 30*a*–30*d* generate a radial field gradient of 640 gauss/cm when the current is on. Fringing effects also create an axial field gradient in the proximity of the electromagnets 30*a*–30*d*. The radial field gradient draws the particles to the walls of the chamber 14, while the axial field gradient serves to trap these particles when the current to the electromagnets 30*a*–30*d* is on. The supernatant flowing out is free of target-bound magnetic particles during the on cycle. Periodically, the current to the electromagnets 30*a*–30*d* is shut off, releasing these particles into the flowing liquid. The sample flowing out during this off cycle is collected in a separate container. Thus, the feed and magnetic particle flows are never interrupted, and no buffer solution is needed to flush out the magnetic particles, providing a fully continuous operation.

EXAMPLE I

MagaCell-Q (1–10 $\mu$m diameter, with 75% by number between 2–4 $\mu$m) magnetic beads were obtained from Cortex Biochem, Inc. MagaCell-Q particles consist of iron oxide ($Fe_3O_4$) nanoparticles embedded within a quaternary ammonium cellulose matrix. Cadmium sulfate was obtained as ACS grade salt from Aldrich Chemical Company. All solutions were prepared using single distilled reverse osmosis water that was passed through a four cartridge Millipore "Milli Q" system until its resistivity reached 18 MΩ-cm. Metal analysis was done with flame atomic absorption spectrophotemetry (Perkin-Elmer 1100B AAS). Unless stated, all experiments were conducted at overall flow rate of 25 mL/min. MagaCell-Q particles were used at concentration of 0.5 mg/ML and the feed to the first stage consisted of 10. omg/L cadmium sulfate solution. 300 mL of the magnetic particles and an equal volume of a sample containing the feed solution were introduced simultaneously using peristaltic pumps.

Figure 2:
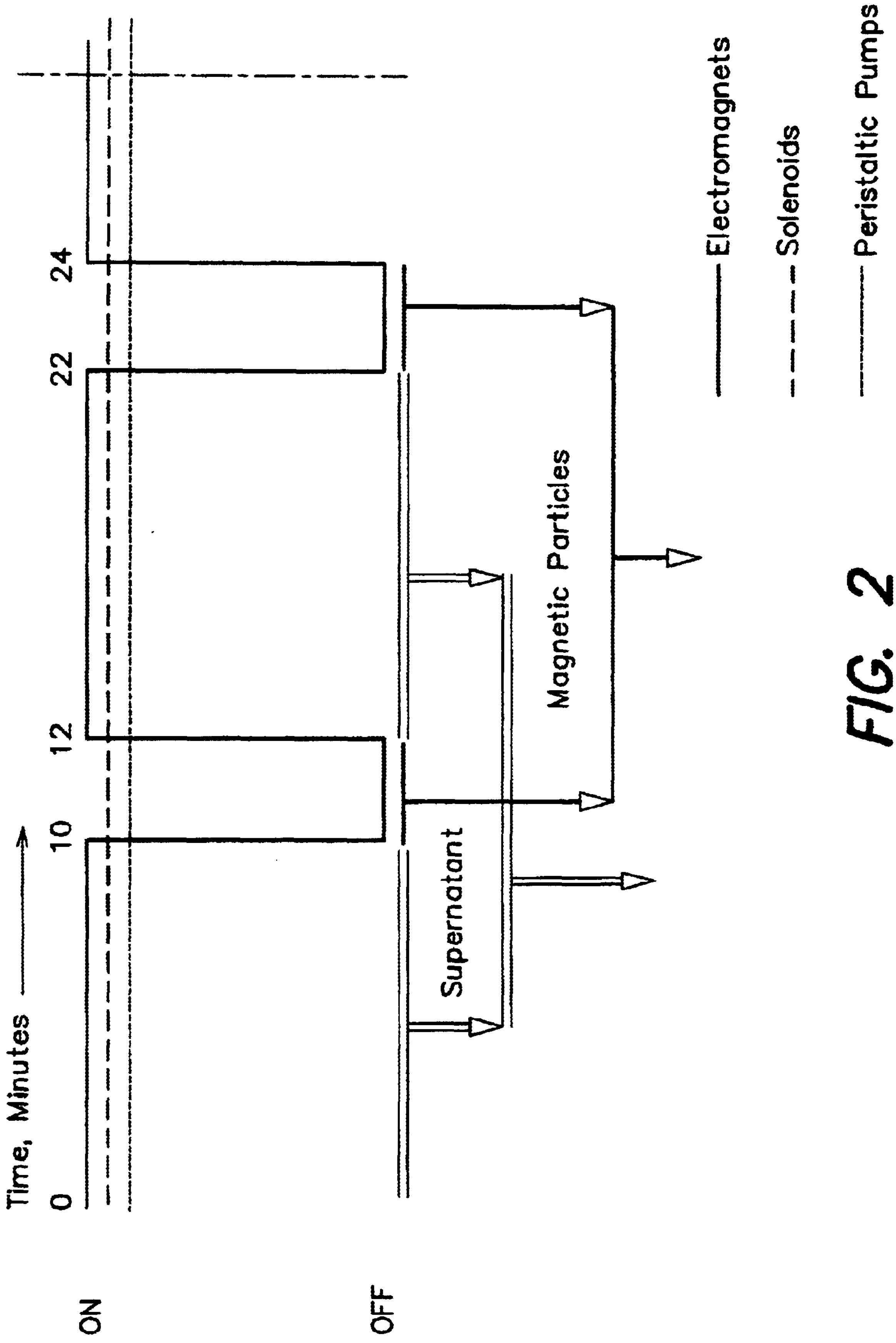
FIG. 2 is an experimental sequence showing the periodical discharge of supernatant and particles.

The chamber is first filled with ~100 mL of distilled water. The cadmium sulfate solution and magnetic particles are driven into the chamber using peristaltic pumps through a rotary coupler, while the chamber is rotated (25 rpm), an alternating current (12 volt, 10 amps) is passed through the solenoid, and the electromagnets are active, permitting immobilization of the magnetic particles on to the chamber walls. The supernatant flowing out through the end of the chamber is collected continuously for 10 min. The current to the electromagnets is then shut off for 2 min and the cadmium ion containing magnetic particles, immobilized at the chamber walls, are now resuspended into the chamber, and driven out from the other end by the bulk flow. These particles are collected in a separate container. Next, the electromagnets are activated and more supernatant is collected for another 10 min. This procedure is repeated until all the cadmium solution is processed. This on-off sequence for the electromagnets is displayed schematically in FIG. 2. The concentration of cadmium ions in the supernatant is then measured and multiplied by the total volume to obtain the total mass of the cadmium in the supernatant.

The experiment was operated in a three-stage cross-current mode. The feed concentration for the second stage was determined to be the total amount of cadmium ions in the supernatant collected from state one, dissolved in the same volume of water as the feed volume for the third stage.

Figure 3:
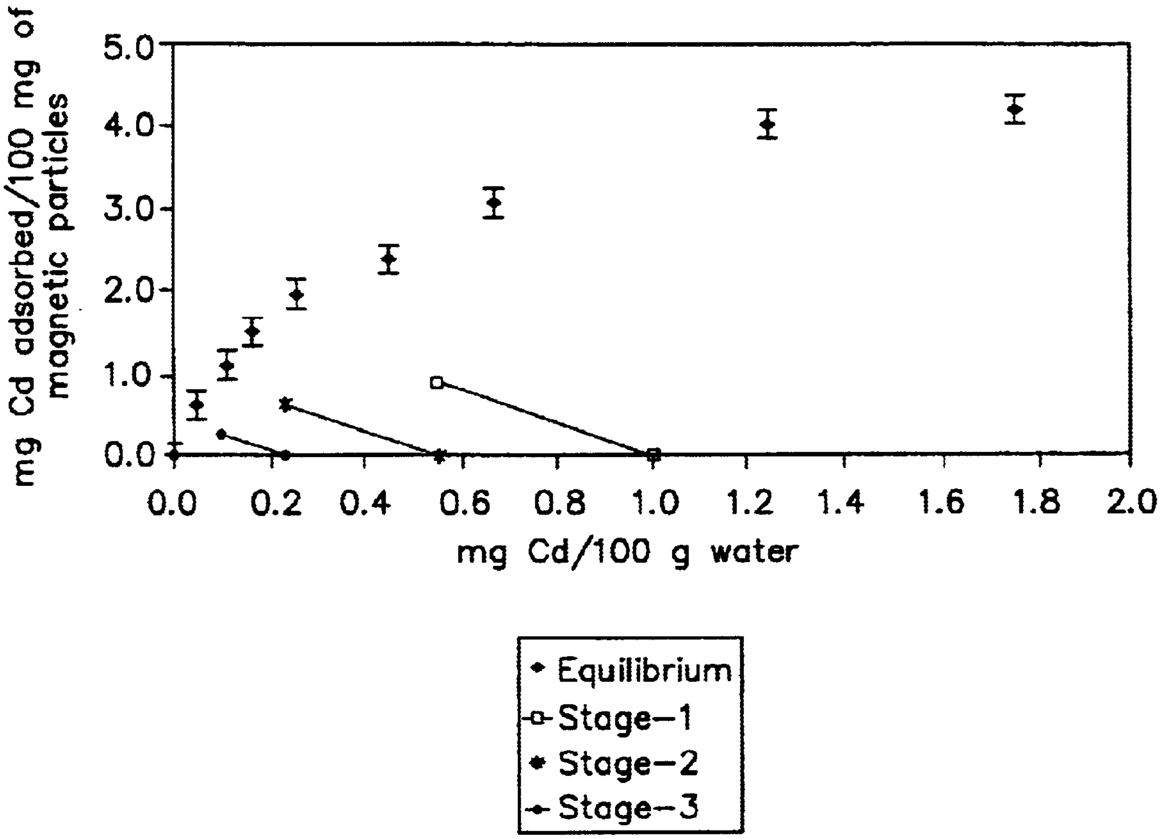
FIG. 3 is a graph showing the Cd(II) adsorbed by magnetic particles versus feed Cd(II) concentration.
Figure 4:
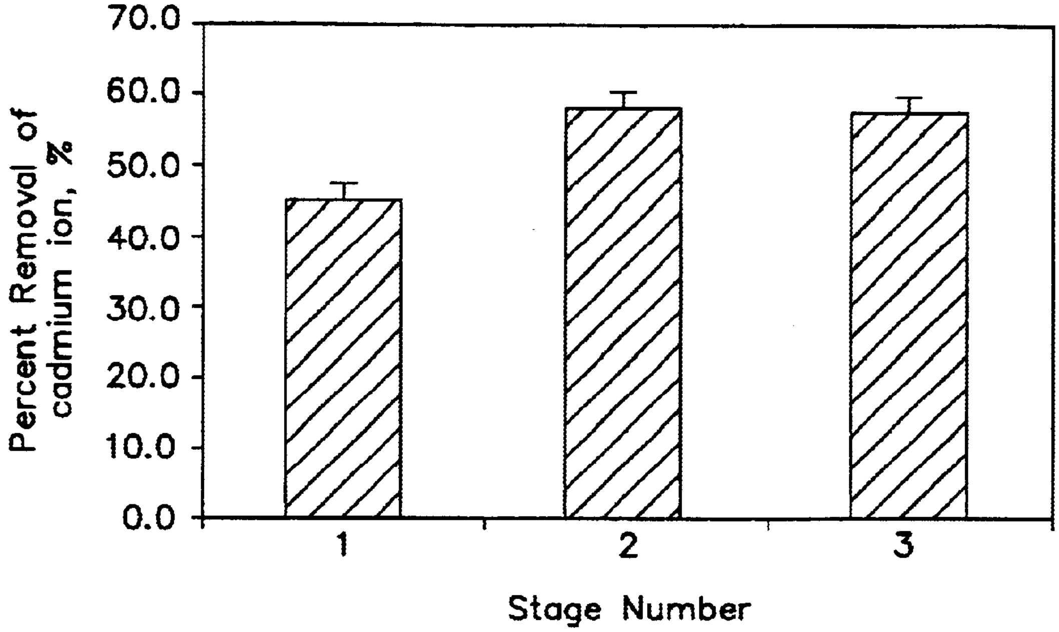
FIG. 4 is a graph showing the stage efficiency measured as the percentage approach to the equilibrium along an operating line.
Figure 5:
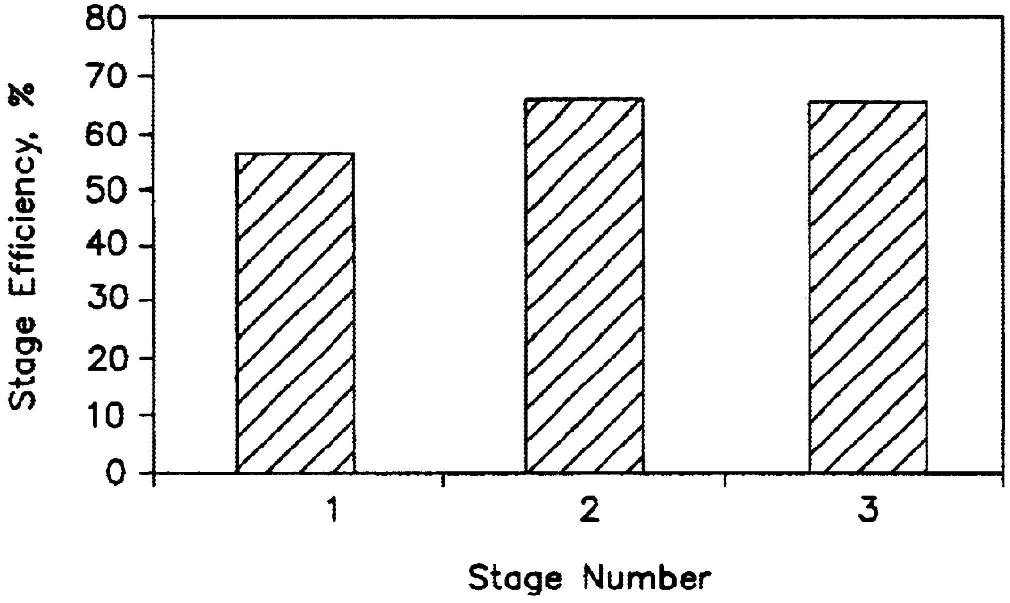
FIG. 5 is a graph showing the percent cadmium adsorbed per 100 mg of magnetic particles at 25 ml/min feed flow rate.

FIG. 3 displays the operating lines from each stage of the three-stage process. The equilibrium data (pH ~7), quantifying the specific adsorption capacity of the MagaCell-Q magnetic particles, is obtained using a series of batch experiments where the particles were exposed to increasing concentration of cadmium sulfate. Referring to FIG. 14, 45% of the entering cadmium ions are removed after one stage, reducing the concentration from 10 mg/L to 5.5 mg/L. Referring to FIG. 5, the stage efficiency, measured as the percent approach to equilibrium along the operating line, is 57%. A further 58% is recovered in stage 2, lowing the concentration of cadmium ions in the supernatant to 2.3 mg/L. The stage efficiency is 63%. At the exit from the third stage, the cadmium concentration is reduced to 0.98 mg/L, and the stage efficiency is 65%.

As all of the resin is on the outside of small diameter particles, they get exposed to the solution, thus overcoming the need for transport of metal ions to internal pore surfaces. This feature is important for both the absorption, as well as the desorption/resin regeneration cycles. In addition, the concurrent flow of the magnetic particles and the cadmium sulfate solution means that pressure drops required to mobilize the solution through the apparatus is much less than that required for packed beds for the same volumetric flow rate.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A continuous, hybrid field-gradient device for magnetic colloid base separations which comprises:

means for continuously introducing a feed stream into a chamber, the feed stream comprising target particles having an affinity for surface functionalized magnetic particles;

means for introducing the surface functionalized magnetic particle into the chamber;

means for subjecting the magnetic and target particles to translational and rotatable oscillations to enhance the mixing of and the contact between the particles to bind the magnetic particles to the target particles to form capture particles;

means for immobilizing the capture particles on the chamber wall;

means for controlling the residence time of the capture particles on the chamber wall; and means for recovering the target particles.

2. The continuous, hybrid field-gradient device of claim 1 wherein the means for subjecting comprises at least four alternating current solenoids, each solenoid having at least a portion surrounding the chamber.

3. The continuous, hybrid field-gradient device of claim 1 wherein the means for immobilizing comprises at least four electromagnets, each electromagnet having at least a portion surrounding the chamber.

4. The continuous, hybrid field-gradient device of claim 1 wherein the means for controlling comprises a computer.

5. A continuous, hybrid field-gradient device for magnetic colloid base separations which comprises:

a chamber; the chamber having a wall, the wall being secured to a sleeve, the sleeve being adapted for rotatable movement;

an electromagnet surrounding at least a portion of the chamber;

an alternating current solenoid surrounding a least a portion of the chamber, the electromagnet and the solenoid forming a magnetic unit; and a computer in communication with the electromagnet wherein target particles having an affinity for surface functionalized magnetic particles are separated from a feed stream when the feed stream and the magnetic particles are continuously flowed into the chamber as the chamber rotates, the solenoid introducing a time varying axial magnetic field gradient that causes translational and rotary oscillation of the magnetic particles thereby enhancing the mixing of and the contact between the target particles and the magnetic particles, the electromagnet generating a radial magnetic field gradient within the tube to allow the magnetic particles and the target particles bound to the magnetic particles to be drawn to the walls of the tubes, the computer controlling the residence time of the magnetic particles and the target particles bound to the magnetic particles on the walls thereby allowing for the uninterrupted flow of the feed stream and magnetic the particles during the separation.

6. A magnetic affinity separation process which comprises:

continuously introducing a feed stream into a chamber, the feed stream comprising target particles;

introducing a magnetic particle into the chamber, said magnetic particles having a binding affinity for the target particles;

subjecting the particles to translational and rotatable oscillations to enhance the mixing of and the contact between the particles to bind the magnetic particles to the target particles to form capture particles;

immobilizing the captured particles on the chamber wall;

controlling the residence time of the captured particles on the chamber wall; and recovering the target particles.

7. The process according to claim 6 wherein subjecting comprises:

surrounding at least a portion of the chamber with a stationary alternating current solenoid, the solenoid having an end.

8. The process according to claim 7 wherein immobilizing comprises:

positioning a direct current flowing, computer-controlled electromagnet downstream of the solenoid.

9. The process according to claim 8 wherein the electromagnet is positioned at a distance of about 4.0 cm from the end of the solenoid.

10. The process according to claim 7 wherein the controlling comprises:

manipulating the on-off cycle of the electromagnet.

* * * * *